U. WEDGE.
FURNACE.
APPLICATION FILED FEB. 11, 1914. RENEWED APR. 27, 1916.
1,208,247.
Patented Dec. 12, 1916.
5 SHEETS—SHEET 1.
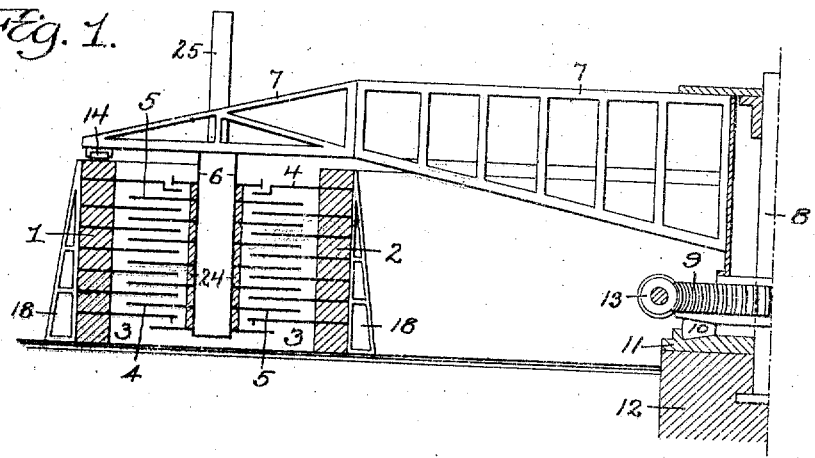
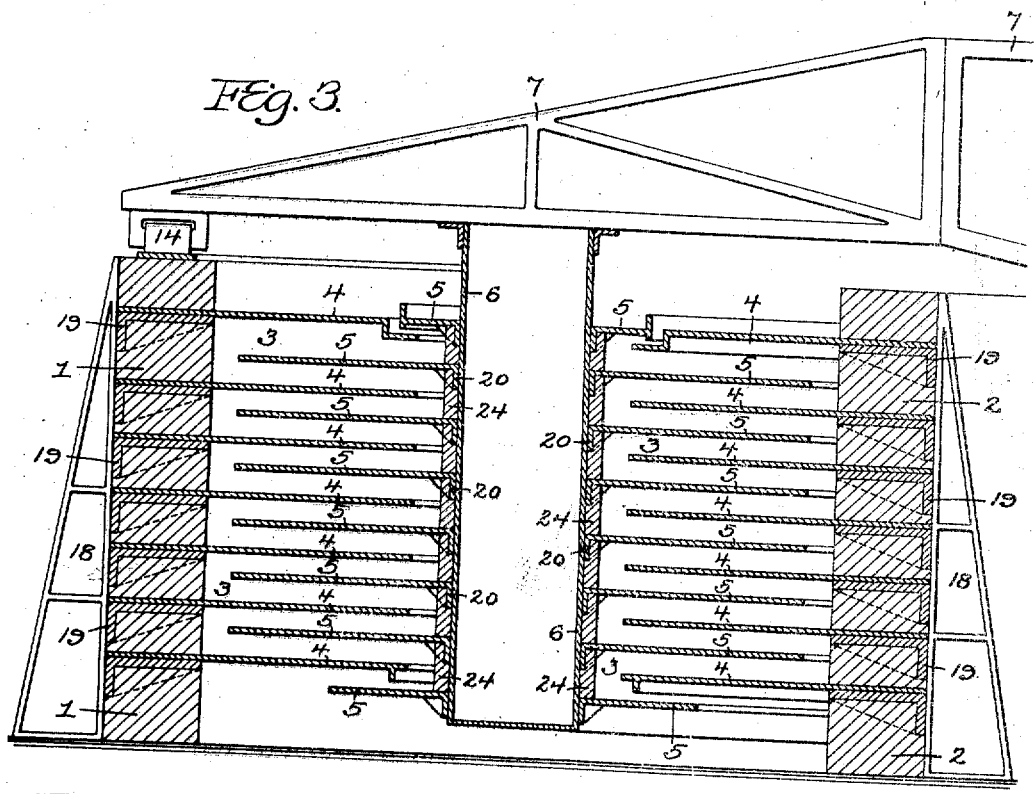
WITNESSES
INVENTOR
UTLEY WEDGE
BY HIS ATTORNEY

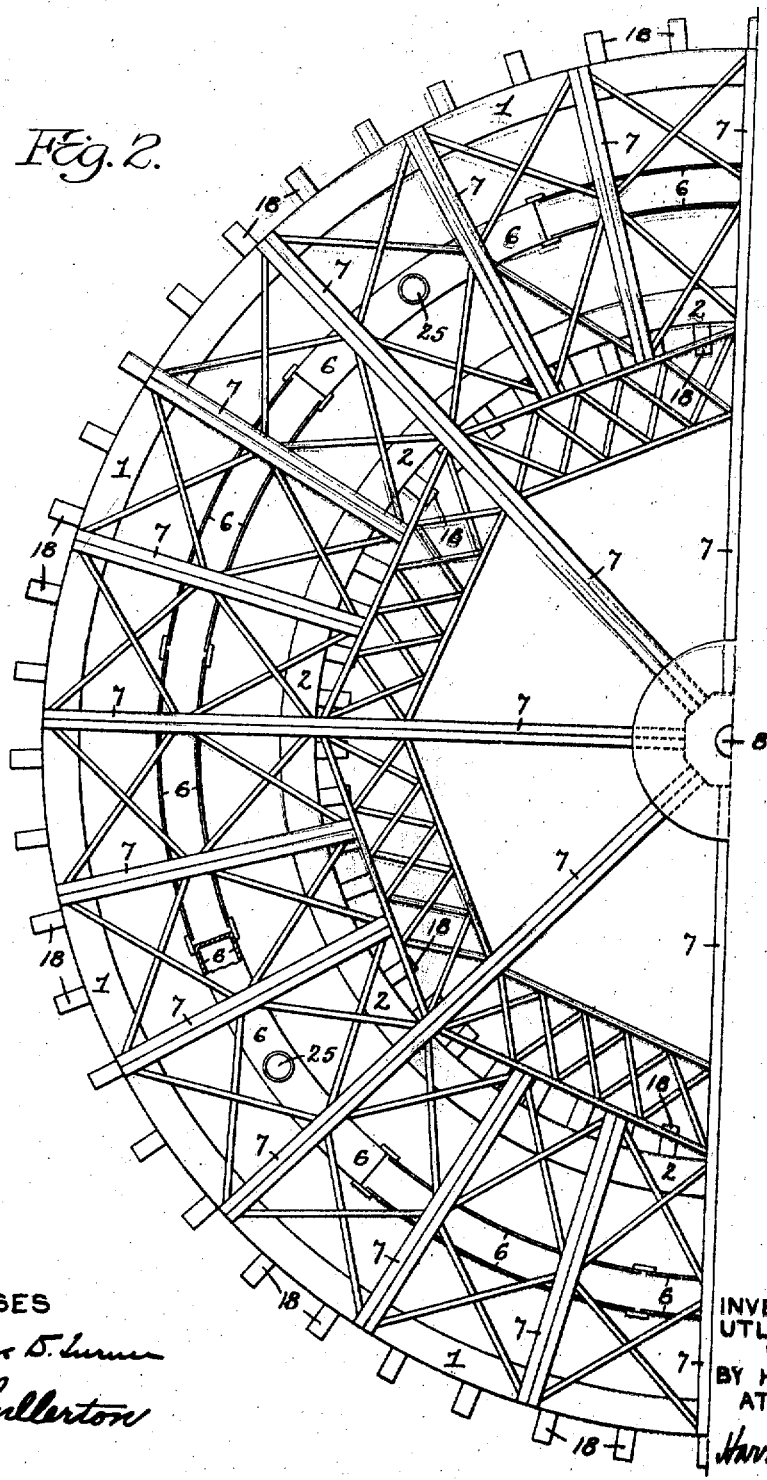

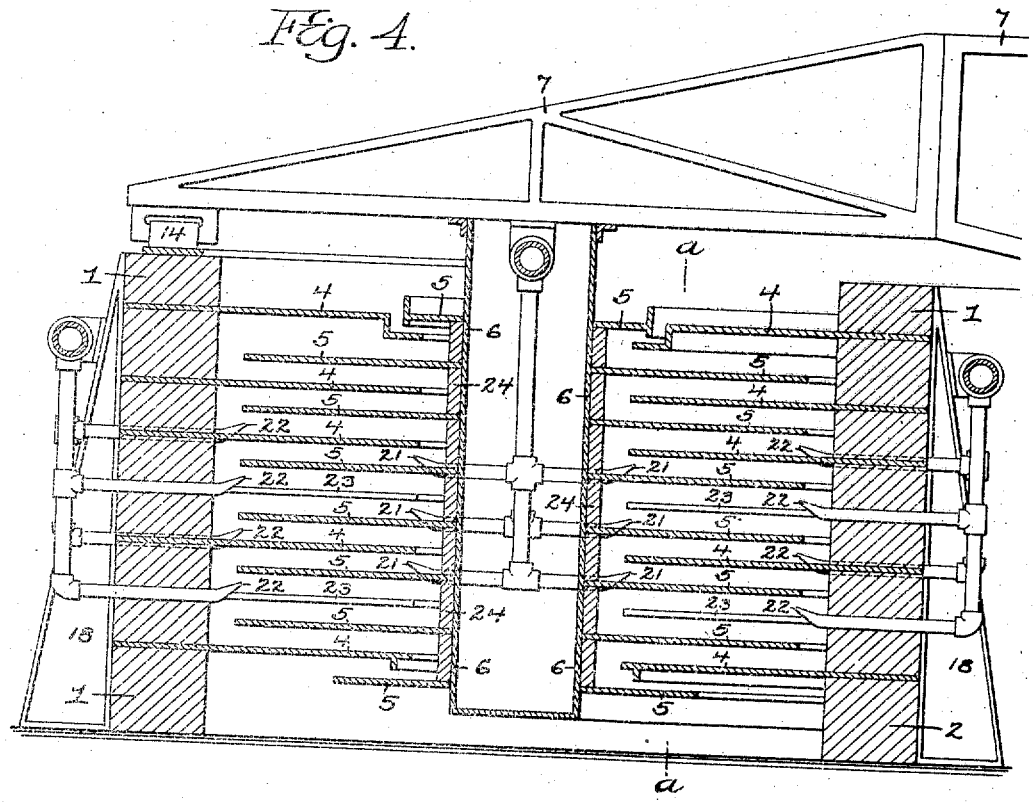
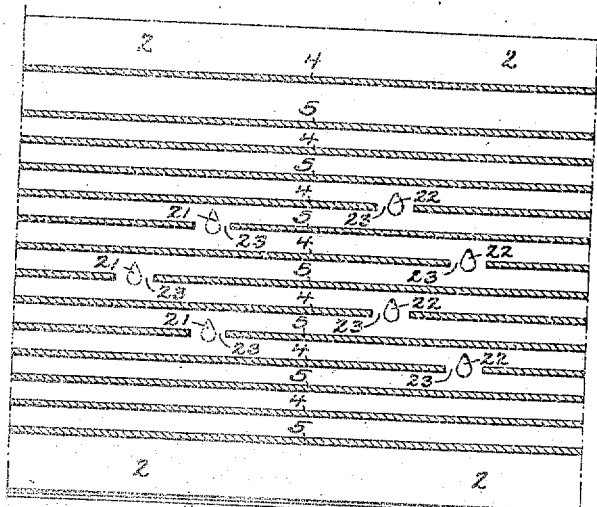

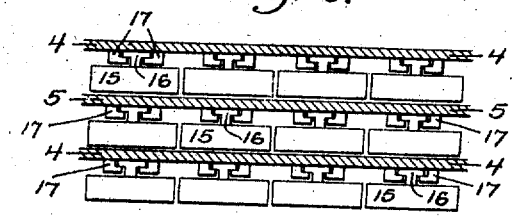
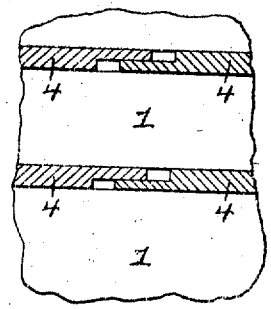
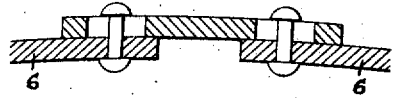
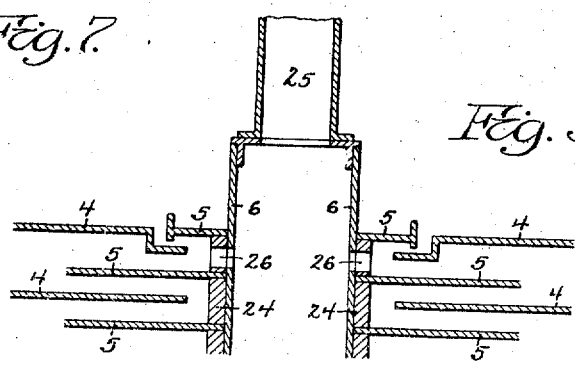
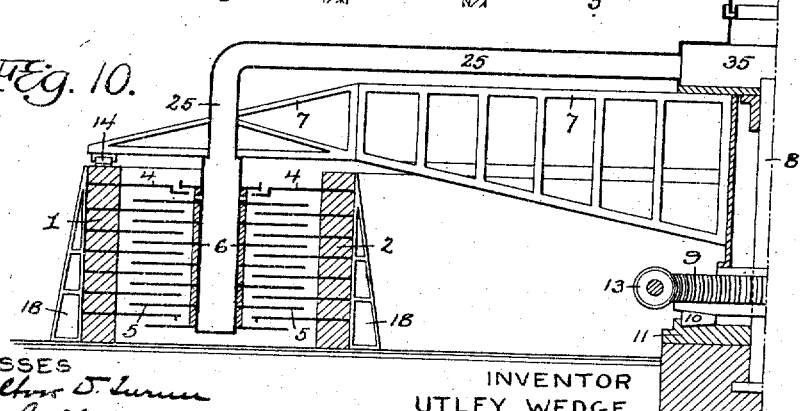

U. WEDGE.
FURNACE.
APPLICATION FILED FEB. 11, 1914. RENEWED APR. 27, 1916.

1,208,247. Patented Dec. 12, 1916.
5 SHEETS—SHEET 5.

WITNESSES

INVENTOR UTLEY WEDGE
BY HIS ATTORNEY Harry Smith

UNITED STATES PATENT OFFICE.

UTLEY WEDGE, OF ARDMORE, PENNSYLVANIA.

FURNACE.

1,208,247.  Specification of Letters Patent.  Patented Dec. 12, 1916.

Application filed February 11, 1914, Serial No. 818,049.  Renewed April 27, 1916. Serial No. 94,052.

*To all whom it may concern:*

Be it known that I, UTLEY WEDGE, a citizen of the United States, residing in Ardmore, Pennsylvania, have invented certain Improvements in Furnaces, of which the following is a specification.

The objects of my invention are to so construct a furnace, drier, evaporator, cooler, concentrator or like structure (hereinafter, for convenience, termed a "furnace") as to provide extended hearth area in proportion to height; to free the space below the hearth chamber from all driving gears or other obstructions, to provide for the uniform heating of the furnace and uniform flow of the products of combustion and other gases therethrough, to prevent rapid burning out of the hearths, and to provide a structure which, considering its capacity, can be built and operated at relatively small expense.

These objects I attain in the manner hereinafter set forth, reference being had to the accompanying drawings, in which—

Figure 11:
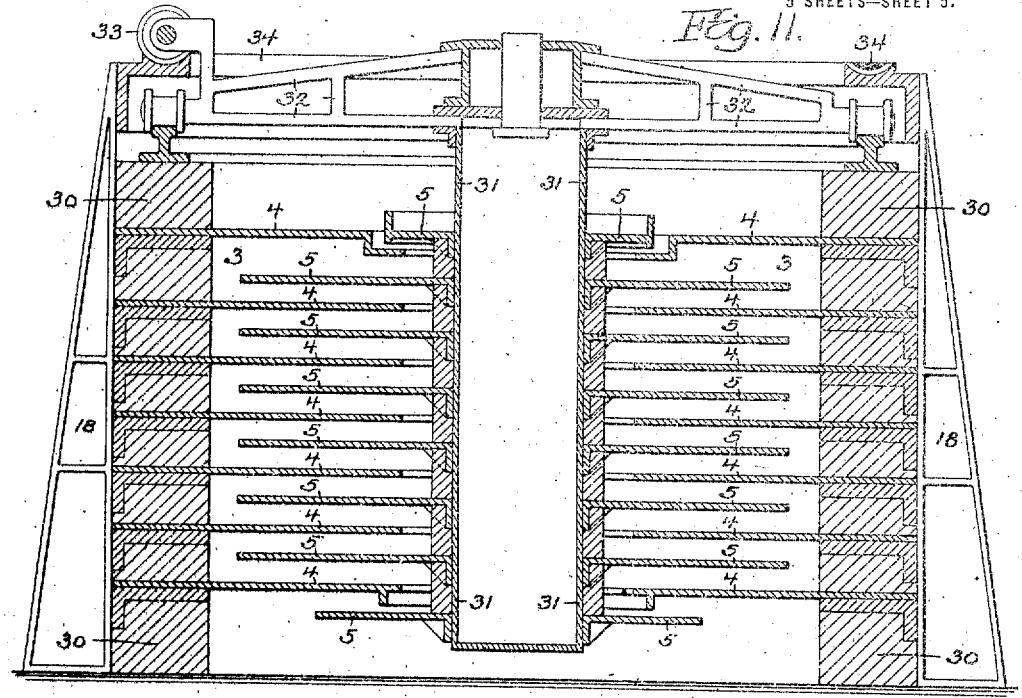
Figure 12:
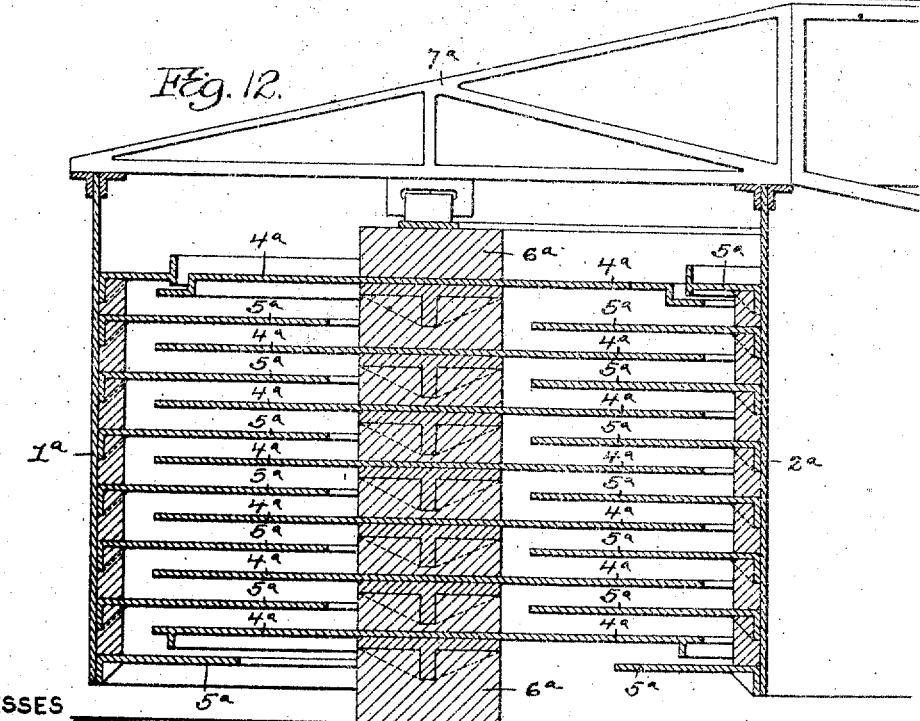

Figure 1 is a view, partly in transverse section and partly in elevation, of one-half of a furnace constructed in accordance with my invention, the other half of the same being similar to that represented; Fig. 2 is a top or plan view of that half of the furnace shown in Fig. 1; Fig. 3 is a sectional view, on a larger scale, of the furnace chamber and its hearths, illustrating the means for mounting the latter; Fig. 4 is a view similar to Fig. 3, but showing a section through another part of the furnace chamber so as to illustrate means for heating the hearths; Fig. 5 is a section on the line *a—a*, Fig. 4, showing a part of each hearth developed in a flat plane; Figs. 6, 7 and 8 are enlarged sectional views of parts of the furnace intended to illustrate certain structural features of the same not clearly shown in Figs. 1 to 3; Fig. 9 is a vertical section of the upper portion of one of the stack-carrying members of the furnace; Fig. 10 is a view similar to Fig. 1, but illustrating a special form of draft stack, and Figs. 11 and 12 are views similar to Fig. 3, but illustrating modifications of my invention.

The furnace shown in Figs. 1 to 4 has fixed annular walls 1 and 2 of such relative diameter as to contain between them a furnace chamber 3 of the desired capacity, this furnace chamber containing a series of superposed annular hearths some of which, represented at 4 in the drawing, are fixedly mounted in the walls 1 and 2, and either project inwardly from the outer wall 1 or outwardly from the inner wall 2, while others, indicated at 5 in the drawing, alternate with and lap said hearths 4, these hearths 5 being mounted upon a rotatable annular drum, shell, or other structure 6, which occupies a central position in the furnace chamber and is suspended from a spider 7 which is carried by a vertical shaft 8, the latter occupying an axial position in respect to the annular walls 1 and 2 and structure 6 and being provided with a worm wheel 9 having a beveled under face which travels upon conical rollers 10 interposed between said worm wheel and a conical raceway on a base plate 11, the latter being mounted upon a suitable foundation 12 which also receives the lower end of the shaft 8.

Rotative motion is imparted to the worm wheel 9 and shaft 8 by a worm 13 driven by a motor of any appropriate character.
The means for mounting and driving the spider 7 may, however, be modified as desired without departing from the essential features of my invention. The outer portion of the spider 7 overlaps the furnace chamber and carries rollers 14 which run upon suitable tracks on the top of the wall 1. The furnace thus presents inner and outer fixed annular hearths 4 and inner and outer rotating annular hearths 5 alternating with said hearths 4 and suspended from the spider 7, so that great hearth area can be obtained by providing a furnace chamber of the necessary diameter, the height of the furnace chamber being low because the hearths can be disposed relatively close together, no rabble carrying arms being necessary, as the rabbles can be applied directly to slotted ribs on the undersides of the hearths, as shown for instance in Fig. 6, in which 15 represents a rabble blade having, at the top, a T-shaped tongue 16 which is adapted to a similarly shaped slot in a rib 17 formed on the underside of the hearth. The rabbles are not shown in Figs. 1, 3, 4, 5, 9, 10, 11 and 12 of the drawings because of the small scale of these figures.

The walls 1 and 2 of the furnace chamber are stiffened and strengthened by structural steel braces 18 and the fixed hearths 4 are carried by brackets 19 mounted upon these braces, the rotating hearths 5 being mounted upon brackets 20 secured to the annular structure 6 whose inner and outer members are spaced so far apart that an attendant can pass freely between them in order to gain access to the fastenings of said brackets or to attend to the heating devices carried by said shell and hereinafter referred to.

The heating devices which I prefer to use are gas or oil burners 21 mounted upon and moving with the rotating structure 6 and like burners 22 carried by the fixed walls 1 and 2, as shown in Figs. 4 and 5, each of the hearths 4 and 5 having a gap 23 therein wherever a burner is located, and said burners being, by preference, so disposed that each of the burners 21 will project its flame through a gap 23 in one of the hearths 5 and onto the bottom of the hearth 4 above said hearth 5, while each of the burners 22 will project its flame through a gap 23 in one of the hearths 4 and onto the bottom of the hearth 5 above said hearth 4. The rotating burners 21 thus serve to heat the fixed hearths 4 and the fixed burners 22 serve to heat the rotating hearths, 5, consequently in each rotation of the structure 6 each of the burners 21 acts upon the entire area of its corresponding hearth 4 and each of the burners 22 acts upon the entire area of its corresponding hearth 5, no portion of either hearth being subjected continuously to the action of a flame from either burner so as to be overheated thereby. I can therefore employ cast iron plates for the hearths and thereby materially simplify and cheapen the construction of the furnace except in cases where the necessary operating temperature of the furnace is so high as to require the use of hearths of firebrick of other refractory material.

The burners are distributed around the walls 1 and 2 and structure 6 as may be required to provide the desired amount of heat, and the gaps 23 in each of the hearths 4 are out of line vertically with the gaps in the hearths 4 above and below the same, as shown in Fig. 5, so as to prevent the dropping of material through a series of hearths 4 when a gap in a rotating hearth 5 happens to be in line with a gap in the fixed hearth 4.

While I prefer for the sake of convenience to use gas or oil burners as a means of supplying heat to the furnace, fireplaces using coal or other fuel may be substituted therefor, if desired, and are intended to be included under the general term "burners" as herein used.

When the burners are disposed as described so as to cause the products of combustion to act upon the under sides of the hearths instead of directly upon the ore or other material supported by the hearths, the effect resembles, in a measure, that of a muffle furnace having below its hearths heating chambers for the circulation of the products of combustion.

In order to protect the inner and outer members of the annular structure 6 from the heat maintained in the furnace chamber said members are preferably provided, on their hearth sides, with a covering 24 of firebrick, tile, or other refractory material, which also serves to protect the fastenings for the hearth supporting brackets 20. The brackets 19 upon which the fixed hearths 4 are supported are protected from the heat of the furnace chamber by being embedded in the walls 1 and 2.

By suspending the rotating hearths 5 from above the furnace the lower portion of the furnace chamber is free from any shaft supports or shaft driving devices, which is, in many cases, a great advantage, and which is also of advantage in a circular furnace having a cylindrical wall 30 carrying the fixed hearths, and a central, suspended shaft 31 carrying the rotating hearths, as shown in Fig. 11. In this modification I have shown the supporting structure 32 for the shaft 31 as mounted upon wheels running on rails on the wall 30, said structure being rotated by engagement of a worm 33 with a fixed worm wheel 34 fixedly mounted above the wall 30, the shaft of the worm being rotated by any suitable motor mounted upon the supporting structure. An annular hearth-carrying structure similar to the structure 6, may also be suspended from structures 32, distributed around the same, and having wheels running on rails on the inner and outer annular walls, said structures being driven either as shown in Fig. 11, or by otherwise rotating the same.

The hearth plates 4 and 5 are preferably constructed in sections with overlapping joints, as shown in Fig. 7, so as to permit them to expand or contract under variations in temperature to which they are subjected, and the structure 6 is likewise composed of sections with expansion joints such as shown for instance in Fig. 8 for a like reason.

As the burners for heating the hearths are constantly changing their position in respect to said hearths it follows that the uniform heating of all of the material in the furnace chamber will be effected, and in order to effect a like uniform draft throughout all portions of the furnace chamber the draft stacks 25 are mounted upon and rotate with the structure 6 so as to constantly change the draft points in respect to the furnace chamber.

Each of the stack-carrying sections of the structure 6 is closed at top, bottom and ends, and thus constitutes a draft chamber which communicates with the stack, and also with the upper portion of the furnace chamber, the latter communication being effected through openings 26 formed in the inner and outer members of the structure 6, and in the refractory coverings 24 applied thereto, as shown in Fig. 9.

When it is desired to collect, for subsequent utilization, the gases escaping from the furnace, the stacks 25 may unite in an axially disposed stack 35, having a properly luted joint with a fixed stack 36, as shown in Fig. 10, said stack 36 communicating with any desired storage or utilization plant.

By preference, the uppermost of the fixed and rotating hearths are in the same plane and the rotating hearths are flanged at their outer edges, thereby providing at the top of the furnace chamber a drying floor and a luted passage from the same to the next lowest hearth, as shown in Fig. 3.

The burners 21 and 22 are, by preference, employed only in connection with the hearths in the lower portion of the furnace chamber, the upper hearths being used as pre-heating hearths.

The construction of my improved furnace provides for the ready removal and replacing of any one of the hearth sections, consequently the operation of the furnace does not have to be interrupted for long periods of time in order to effect hearth repairs, it being understood that the walls 1 and 2 are properly apertured for the insertion and withdrawal of the hearth sections.

In the modified construction of furnace which I have shown in Fig. 12 the structure 6ª is a fixed structure and carries the stationary hearths 4ª, the walls 1 and 2 being replaced by rotating structures 1ª and 2ª which are suspended from the spider 7ª and carry the movable hearths 5ª.

While I have shown each of the hearth-carrying members 1, 2 and 6 of my improved furnace as provided with a series of superposed hearths and while such construction is always preferred, yet many of the valuable features of my invention may be embodied in a furnace in which each of said hearth-carrying members has but a single hearth.

In addition to the function of suspending the rotatable hearth-carrying structure the spider 7 also serves to brace said structure and impart such rigidity thereto as will prevent any distortion or malformation thereof by the load which it has to carry.

I claim:

1. The combination, in a furnace, of inner and outer fixed annular structures, the inner having an annular hearth projecting outwardly therefrom and the outer having an annular hearth projecting inwardly therefrom, and an intermediate rotating annular structure having annular hearths projecting in both directions therefrom, the inwardly projecting hearth lapping that of the inner fixed structure and the outwardly projecting hearth lapping that of the outer fixed structure.

2. The combination, in a furnace, of inner and outer fixed annular structures, each having a series of superposed annular hearths projecting therefrom, those of the inner structure projecting outwardly and those of the outer structure projecting inwardly, and an interposed rotating annular structure having on each side of the same a superposed series of annular projecting hearths, those on the inner side lapping corresponding hearths of the inner fixed structure and those on the outer side lapping corresponding hearths of the outer fixed structure.

3. The combination, in a furnace, of a fixed annular structure, having an annular hearth projecting therefrom, and a rotating annular structure having an annular hearth projecting therefrom and lapping that of the fixed structure, an axially pivoted structure disposed above said annular structures, and means for suspending the rotating annular structure from said upper structure.

4. The combination, in a furnace of inner and outer fixed annular structures, the inner having an annular hearth projecting outwardly therefrom and the outer having an annular hearth projecting inwardly therefrom, and an intermediate rotating annular structure suspended from above and having annular hearths projecting in both directions therefrom, the inwardly projecting hearth lapping that of the inner fixed structure and the outwardly projecting hearth lapping that of the outer fixed structure.

5. The combination, in a furnace, of inner and outer fixed annular structures, each having a series of superposed annular hearths projecting therefrom, those of the inner structure projecting outwardly and those of the outer structure projecting inwardly, and an interposed rotating annular structure suspended from above and having on each side of the same a series of superposed annular projecting hearths, those on the inner side lapping corresponding hearths of the inner fixed structure and those on the outer side lapping corresponding hearths of the outer fixed structure.

6. A furnace having inner and outer fixed annular walls, annular hearths projecting inwardly from the outer wall and outwardly from the inner wall, a rotating annular structure concentric with and intermediate of said fixed walls, hearths projecting both inwardly and outwardly from said rotating annular structure so as to lap the hearths of the inner and outer fixed structures, and burners carried by one of said annular structures and serving to heat the other annular hearths.

7. A furnace having fixed and rotating hearth-carrying members, and burners carried by both of said members, a rotating burner directing its flame transversely across a fixed hearth and a fixed burner directing its flame directly across a rotating hearth.

8. A furnace having fixed and rotating hearth-carrying structures, each with a series of superposed hearths, those of one member alternating with and lapping those of the other member, each of said members also having a series of burners disposed one above another, the rotating burners directing their flames transversely across the fixed hearths and the fixed burners directing their flames transversely across the rotating hearths.

9. A furnace having a movably mounted draft outlet, and means for moving the same to cause it to communicate successively with different portions of the furnace chamber.

10. A furnace having an annular working chamber therein, a draft outlet, and means for causing movement of said draft outlet around the annular chamber whereby it is constantly changing its position in respect thereto.

11. A furnace having a rotating structure, hearths carried by and projecting therefrom, and a draft outlet carried by and rotating with said hearth-carrying structure.

12. A furnace having a fixed structure, a hearth projecting therefrom, a rotating structure also having a hearth projecting therefrom and lapping that of the fixed structure, and a draft outlet carried by and rotating with said rotating hearth-carrying structure.

13. A furnace having an annular working chamber, a rotating annular structure therein, an annular hearth projecting from said structure, a draft chamber in said rotating annular structure which is in communication with the hearth-receiving working chamber, and a stack carried by and rotating with said rotating annular structure and communicating with said draft chamber.

14. A furnace having an annular working chamber, and a rotating annular hearth-carrying structure therein containing a plurality of separate draft chambers each in communication with the working chamber and each provided with a draft stack.

15. A furnace having a working chamber, a movable draft outlet which communicates successively with different portions of said working chamber, and a fixed final outlet with which said movable draft outlet is in communication.

16. A furnace having a working chamber, a rotating annular structure contained therein and having a draft outlet which travels through said chamber, and a fixed and axially disposed draft outlet in communication with said traveling outlet.

17. A furnace having a fixed annular structure with fixed hearth supported thereby and projecting therefrom, a rotating annular structure carrying a hearth which projects from it and overlaps said fixed hearth, a supporting structure disposed above said annular hearth carrying structures, means for supporting said upper structure upon the fixed annular hearth carrying structure, and means for suspending the rotating annular hearth carrying structure from said upper supporting structure.

18. A furnace having a fixed annular structure, a series of superposed fixed hearths carried thereby and projecting therefrom, a rotating annular structure carrying a series of superposed hearths which project from said structure and overlap and alternate with said fixed hearths, a structure disposed above said annular hearth carrying structures, means for supporting said upper structure upon the fixed annular hearth carrying structure, and means for suspending the rotating annular hearth carrying structure from said upper supporting structure.

19. A furnace having a pair of annular walls, a fixed annular hearth carried by the inner wall and projecting outwardly therefrom, a fixed annular hearth carried by the outer wall and projecting inwardly therefrom, an annular structure rotating between said walls and carrying inner and outer projecting annular hearths which lap the fixed annular hearths of the inner and outer walls, and means for rotating said annular structure from above.

20. A furnace comprising inner and outer annular walls, a series of superposed fixed annular hearths carried by and projecting outwardly from the inner wall, a series of superposed fixed annular hearths carried by and projecting inwardly from the outer wall, an annular structure rotating between said walls and carrying an inner and an outer series of superposed annular hearths which alternate with and lap the fixed hearths of the inner and outer walls, and means for rotating said annular structure from above.

21. A furnace having a fixed structure carrying a projecting hearth, a movable structure carrying a hearth which laps the fixed hearth and has a gap therein, and a burner carried by said movable structure and so disposed as to project products of combustion through the gap in said movable hearth and transversely across the fixed hearth.

22. A furnace having a fixed structure, a hearth projecting therefrom and having a gap therein, a movable structure carrying a hearth which laps the fixed hearth and also has a gap therein, and burners carried by said fixed and movable structures and so disposed that one will project products of combustion through the gap in the fixed hearth and transversely across the movable hearth and the other will project products of combustion through the gap in the movable hearth and transversely across the fixed hearth.

23. A furnace having a fixed structure with a series of superposed hearths, a movable structure carrying a series of superposed hearths which alternate with and lap the fixed hearths, each of said movable hearths having a gap therein, and a series of burners carried by said movable structure and projecting products of combustion through the gaps of the movable hearths and transversely across the corresponding fixed hearths.

24. A furnace having a fixed structure with a series of superposed hearths projecting therefrom and each having a gap therein, a movable structure having a series of projecting hearths alternating with and lapping said fixed hearths and each having a gap therein, and burners carried respectively by said fixed and movable structures and so disposed that the fixed burners project products of combustion through the gaps of the fixed hearths and transversely across the corresponding movable hearths and the movable burners project products of combustion through the gaps of the movable hearths and onto the corresponding fixed hearths.

25. A furnace having hearths composed of sections whose tops are all in the same horizontal plane, said sections having rabbeted and overlapping edges.

26. A furnace having an annular hearth-carrying structure, an annular hearth projecting therefrom and composed of sections disposed side by side and having their tops all in the same plane, said sections having rabbeted and overlapping edges.

27. A furnace having an annular structure composed of sections, with expansion joints between them and annular hearths projecting therefrom and likewise composed of sections whose tops are all in the same plane, said sections being provided with rabbeted and overlapping edges.

In testimony whereof, I have signed my name to this specification, in the presence of two subscribing witnesses.

UTLEY WEDGE.

Witnesses:
KATE A. BEADLE,
HAMILTON D. TURNER.